United States Patent [19]
Farrell

[11] Patent Number: 5,953,411
[45] Date of Patent: Sep. 14, 1999

[54] METHOD AND APPARATUS FOR MAINTAINING AUDIO SAMPLE CORRELATION

[75] Inventor: Robert L. Farrell, Hillsborough, N.J.

[73] Assignee: Intel Corporation, Santa Clara, Calif.

[21] Appl. No.: 08/767,360

[22] Filed: Dec. 18, 1996

[51] Int. Cl.[6] ................................................. H04M 1/58
[52] U.S. Cl. ........................... 379/410; 375/346; 704/216
[58] Field of Search ............................. 364/DIG. 1, 239, 364/239.7, 238.3, 241.9, 242.3, DIG. 2, 238, 240, 242.31; 365/189.05; 395/872; 370/32.1, 29, 30, 31; 379/410, 388–90, 406.11, 420, 392; 348/534, 404–6; 375/208–10, 222, 229, 232, 355, 372, 346, 242; 704/216, 217, 218

[56] References Cited

U.S. PATENT DOCUMENTS

| | | | |
|---|---|---|---|
| 4,802,132 | 1/1989 | Ohsawa | 365/230 |
| 5,193,112 | 3/1993 | Sano | 379/406 |
| 5,239,646 | 8/1993 | Kimura | 395/575 |
| 5,278,872 | 1/1994 | Greenberg | 375/103 |
| 5,371,789 | 12/1994 | Hirano | 379/410 |
| 5,390,250 | 2/1995 | Janse et al. | 379/410 |
| 5,418,321 | 5/1995 | Keller et al. | 84/606 |
| 5,475,791 | 12/1995 | Schalk et al. | 395/2.42 |
| 5,481,753 | 1/1996 | Miyake et al. | 395/823 |
| 5,495,473 | 2/1996 | Cox | 370/32.1 |
| 5,517,129 | 5/1996 | Matsui | 326/27 |
| 5,535,171 | 7/1996 | Kim et al. | 365/233 |
| 5,546,395 | 8/1996 | Sharma et al. | 370/84 |
| 5,615,390 | 3/1997 | Kurahara | 395/834 |
| 5,692,163 | 11/1997 | Fukushima | 395/511 |
| 5,696,990 | 12/1997 | Rosenthal et al. | 395/849 |

*Primary Examiner*—Fan S. Tsang
*Attorney, Agent, or Firm*—Kenyon & Kenyon

[57] ABSTRACT

Input/output sample correlation is achieved through the use of first and second correlation tags appended to input and output buffers, respectively. As an output buffer of output samples is prepared, the first correlation tag identifies one of tie output samples in that buffer. As input samples are input and placed into an input buffer, a second correlation tag is appended to the input buffer which identifies the input sample that is input at the time the output sample identified by the first correlation tag is output. Accordingly, a correlation between input and output samples can be used in an echo cancellation operation or the like.

22 Claims, 6 Drawing Sheets

Fig. 7

| | | |
|---|---|---|
| Data from 53'b Sample 0 | 0 | |
| Data from 53'b Sample 1 | 1 | |
| ⋮ | | |
| Data from 53'b Sample 77 | 77 | |
| Data from 53'b Sample 78 | 78 | |
| Data from 53'b Sample 79 | 79 | IB₁ |
| ⋮ | | |
| Data from 53'b Sample 255 | 255 | |
| Data from 51'a Sample 178 | 0 | |
| Data from 51'a Sample 179 | 1 | |
| ⋮ | | |
| Data from 51'a Sample 255 | 77 | |
| Data from 51'b Sample 0 | 78 | OB₁ |
| Data from 51'b Sample 1 | 79 | |
| ⋮ | | |
| Data from 51'b Sample 177 | 255 | |

METHOD AND APPARATUS FOR MAINTAINING AUDIO SAMPLE CORRELATION

BACKGROUND OF THE INVENTION

The present invention pertains to a method and apparatus for maintaining audio sample correlation, and more particularly, to a method and apparatus for maintaining input and output audio sample correlation for echo cancellation.

Referring to FIG. 1, a general block diagram of a speaker phone system is shown. User A has a speaker 21a and microphone 23a while User B has his/her own speaker 21b and microphone 23b. User A and User B are coupled together via a transmission medium 20 such as the Internet or telephone system (e.g., Plain Old Telephone Service or POTS). When an input signal is received at microphone 23a (e.g., when User A speaks), there is a possibility that the sound being emitted by speaker 21a will also be received as an input signal at microphone 23a thus causing an echo at User B. To control this echo, an echo cancellation component (EC) 25a receives the input signal from microphone 23a and the signal being output to speaker 21a. Accordingly, echo cancellation component 25a cancels the signal output by speaker 21a from the input signal at microphone 23a (i.e., eliminates the echo that would be perceived by User B if the input signal did not go through this processing). A similar echo cancellation component 25b is provided for User B.

Referring to FIG. 2, a known system for implementing a speaker phone with echo cancellation is shown. The system includes a coder/decoder (codec) 15 coupled to an audio output device (e.g., speaker 16) and an audio input device (e.g., microphone 17). A central processing unit (CPU) 11 is also provided coupled to one or more buses 10. A component including a device driver 13 is coupled to bus 10 and performs a variety of functions to facilitate the sending and receiving of data buffers to and from codec 15. A memory device 19 such as Random Access Memory (RAM) is coupled to bus 10 and is used to store data that is sent to and from codec 15 by device driver 13. During the operation of the system in FIG. 2, incoming data from transmission medium 8 is received by transceiver 9 and placed in buffer RD. The protocol information from the incoming data is "stripped" away and the data is placed in an output buffer OUT.

The output buffer (OUT) for speaker 16 flows to codec 15 and to speaker 16. If the system of FIG. 2 is used in a speaker phone application, there is a substantial possibility that sound emitted from speaker 16 will be received as input to microphone 17. Correlated input/output buffers (e.g., for time $t_1$) are created at codec 15 and sent back to memory 19. Referring back to FIG. 2, echo cancellation component 12 operates on correlated samples which includes an audio input sample and the audio output sample which was playing at the time the input sample was taken. These samples are typically provided in correlated buffers stored in memory 19. For example, an input buffer of 256 samples taken at time $t_1$ ($IB_1$) can be stored adjacent to a correlated output buffer of 256 samples output at time $t_1$ ($OB_1$) in memory 19. Likewise, additional input and output buffers can be stored for times $t_2$ to $t_n$. The echo cancellation component 12 accesses the correlated input/output buffers of memory 19 and generates the appropriate output data to be sent to the end user which is placed in buffer SD. The proper protocol information is added to buffer SD and the outgoing data is sent by transceiver 9 over transmission medium 8. In the system of FIG. 2, there are several quantities of data flowing to and from codec 15. Thus, at least three buffers of data (OUT, $IB_1$, and $OB_1$) flow between codec 15 and device driver 13. If the codec resides in a modem coupled to bus 10 via a serial channel, the amount of data flowing to and from codec 15 may exceed the available bandwidth available across the serial channel, thus degrading performance.

SUMMARY OF THE INVENTION

According to the apparatus and method of the present invention, input/output sample correlation is achieved by first preparing an output buffer which includes a plurality of output samples and appending a first correlation tag to this output buffer that identifies one of the output samples in the output buffer. The output samples are then output from the system while input samples are input to the system. As the input samples are input they are placed in an input buffer and a second correlation tag is appended to the input buffer which identifies the input sample that is input at the time the output sample identified by the first correlation tag is output. The input sample identified by the second correlation tag is correlated with the output sample identified by the first correlation tag, thus providing input/output sample correlation which can be effectively used in echo cancellation operations or the like. By using correlation tags in the input and output buffers, fewer buffers are needed, which improves bandwidth.

BRIEF DESCRIPTION OF THE DRAWINGS

FIG. 7 shows an exemplary construction of a correlated buffer according to an embodiment of the present invention.

DETAILED DESCRIPTION

Figure 2:
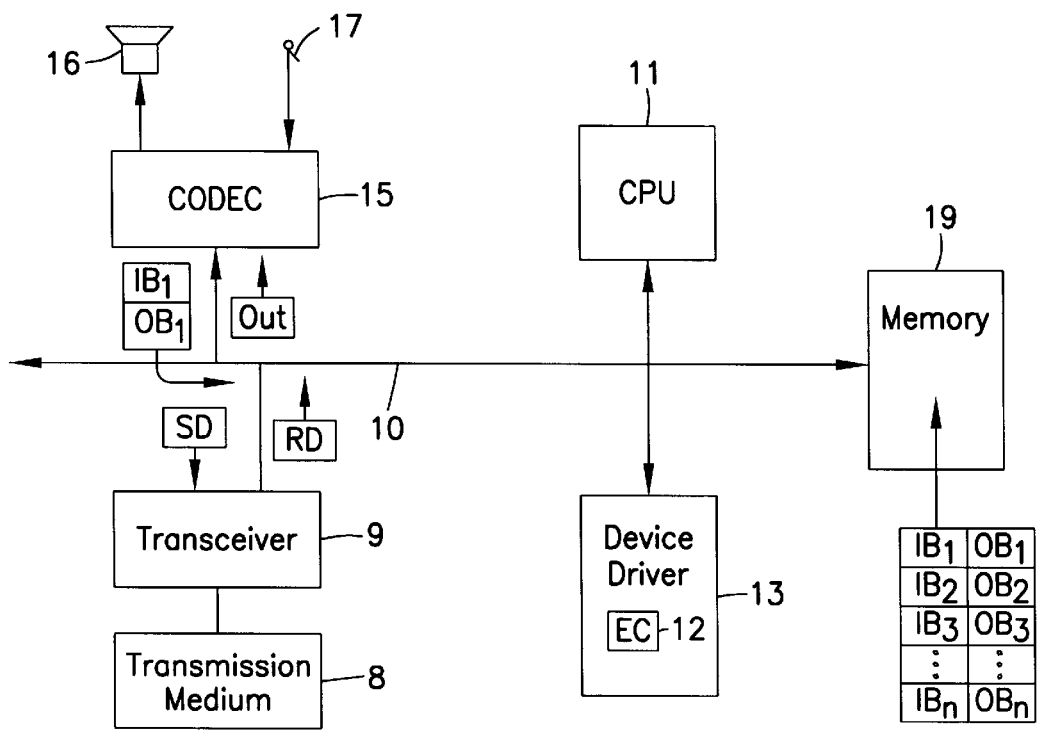
FIG. 2 is a block diagram of a speaker phone system known in the art that employs echo cancellation.
Figure 3:
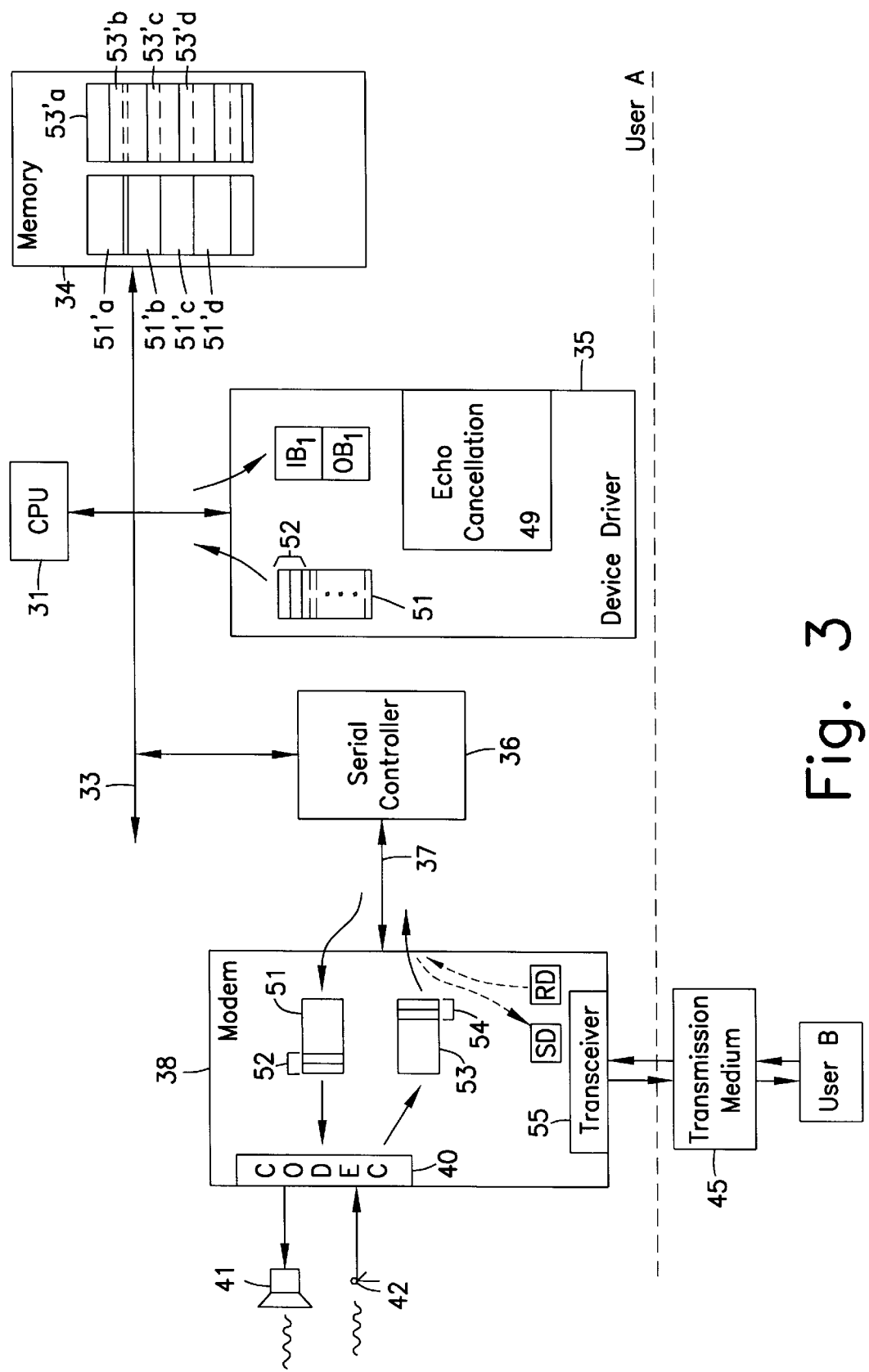
FIG. 3 is an exemplary block diagram of a speaker phone system constructed and operated according to the present invention.

Referring to FIG. 3, a block diagram of a speaker phone system constructed and operated according to the present invention is shown. Similar to the system in FIG. 2, a CPU 31 is provided coupled to one or more buses 33 (e.g., running according to the Peripheral Component Interconnect specification, Version 2.1, 1995 (PCI Special Interest Group, Portland, Oreg.)). A memory device 34 is coupled to bus 33 as well as a device driver 35 and a serial controller 36. The serial controller 36, in turn is coupled to a modulator/demodulator (modem) 38 via a serial line 37 (e.g., operated according to the RS-232 standard; Electronics Industries Association). The modem 38 is coupled to a speaker 41 and a microphone 42 via a codec 40. The components within block User A are coupled to User B via a transmission medium 45 such as a POTS telephone system or the Internet.

Figure 4:
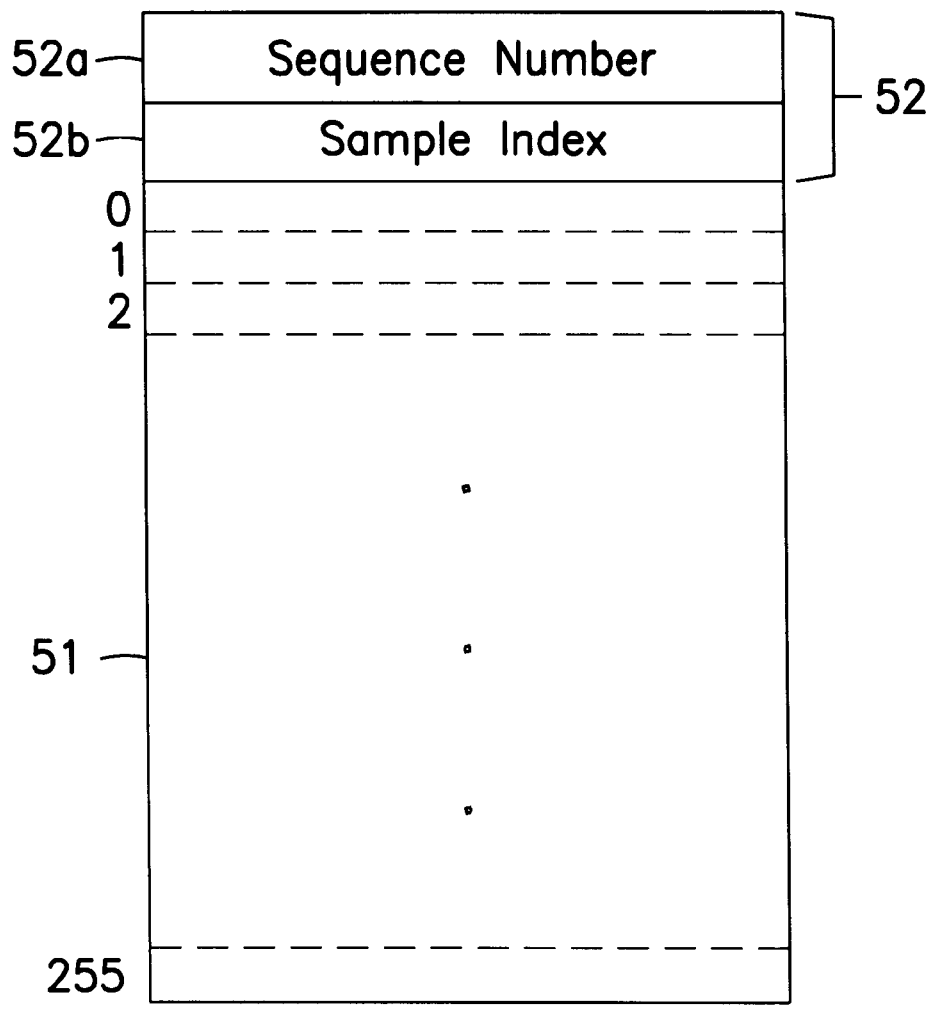
FIG. 4 shows an output buffer including a correlation tag according to the present invention.

Data from User B is received from the transmission medium 45 at a transceiver 55 (which can be a part of modem 38) and placed in buffer RD. The Contents of buffer RD are sent across serial line 37, and after any protocol information is stripped, this incoming data is placed into an output buffer 51 having a length of 256 bytes, for example, in device driver 35. According to the present invention, a first correlation tag 52 is appended (e.g., prepended) to output buffer 51 in device driver 35. Referring to FIG. 4, an output buffer 51 with a correlation tag 52 is shown. The correlation tag 52 can be a sixteen bit data structure comprising two eight-bit bytes which includes a sequence number 52a and a sample index 52b. The sequence number 52a refers to output buffer 51, and is incremented for each output buffer sent to speaker 41. The sample index 52b refers to a particular output sample (e.g., an eight-bit audio sample) in the output buffer identified by the sequence number 52a. The value selected for the sample index 52b is somewhat arbitrary, and can be easily set to zero which would refer to the first sample in the output buffer 51 (identified at the left by the numeral "0").

A copy of the output buffer 51 with the correlation tag 52 is stored locally (e.g., in memory device 34). The output buffer 51 and correlation tag 52 are sent to modem 38 via serial controller 36. In this example it is assumed that output buffer 51 shown in modem 38 has a sequence number of 2 and a sample index number of 0. The codec 40 receives the output buffer 51 and correlation tag 52. At the time that codec 40 is converting the output buffer 51 to output signals for speaker 41, codec 40 is also receiving input data from microphone 42. The codec 40 creates an input buffer 53 with a second correlation tag 54 prepended to it having the same structure as the output buffer 51 and correlation tag 52, respectively. As each input sample comes into codec 40, each input sample is placed into a consecutive location in the input buffer 53. For example, the input samples are placed into locations 0–255 in a consecutive manner. At the point that the output sample referred to by the sample index 52b of the correlation tag 52 is output (e.g., sent to speaker 41), the sequence number 52a of the output buffer in which this identified output sample resides is copied into the sequence number field 54a of the correlation tag 54 of the input buffer 53 currently being filled. The input sample that is input concurrently with the aforementioned identified output sample is placed into the input buffer 53 and the location (e.g., a value between 0 and 255 in this example) is placed in the sample index field 54b of the correlation tag 54 of this input buffer 53. The input buffer 54 is subsequently sent to device driver 35 via modem 38 and serial controller 36.

Figure 5:
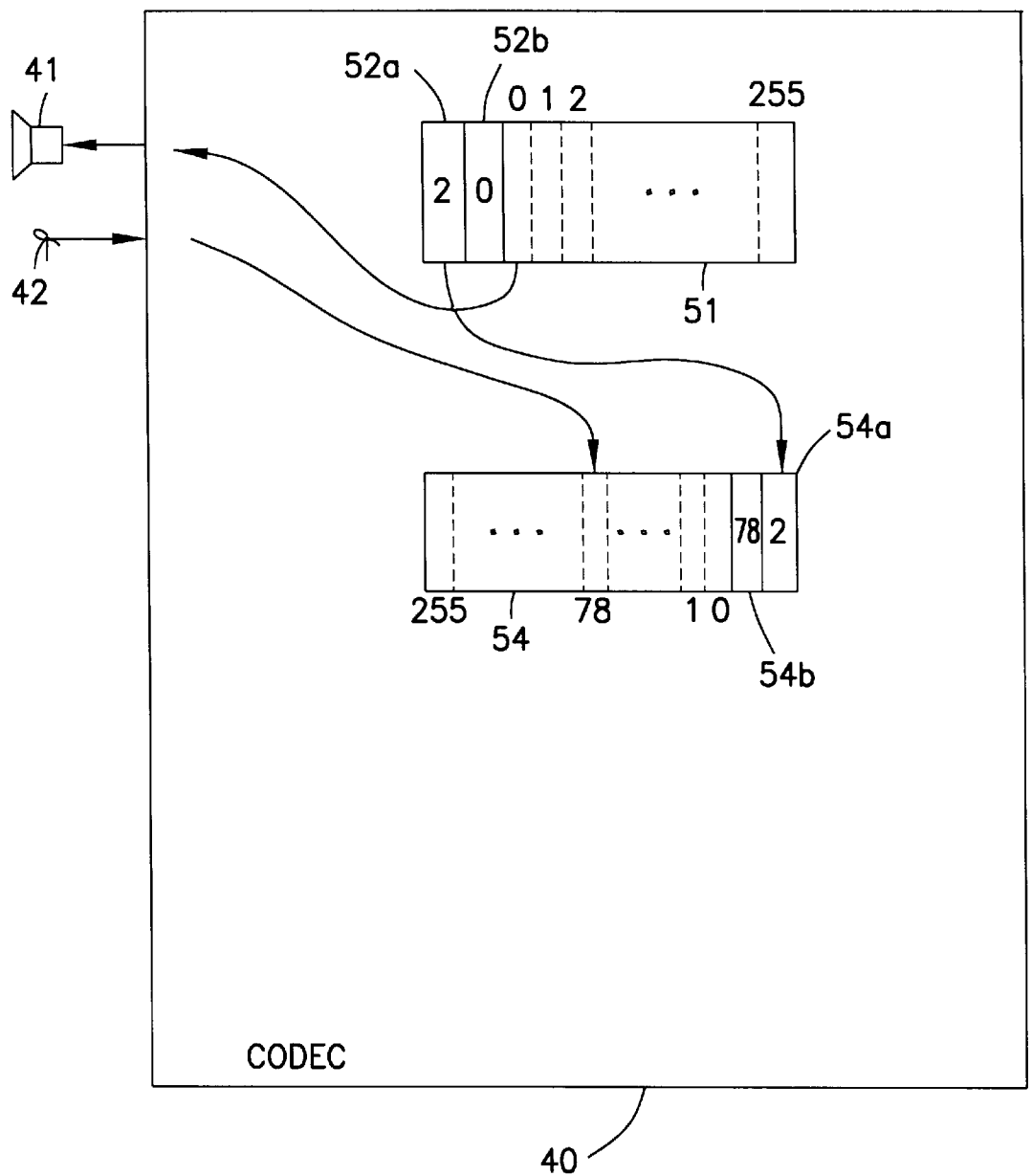
FIG. 5 shows the selection of values for correlation tags performed according to the present invention.

To further illustrate this procedure, reference is made to FIG. 5, where an input buffer 53 and output buffer 51 are shown with their corresponding correlation tags 54 and 52. The sequence number field 52a of the correlation tag 52 refers to the output buffer 51, itself, and has a value in this example of 2. The sample index field 52b refers to the identified output sample of the output buffer 51 and has a value of 0 in this example. When the identified output sample is sent to speaker 41, the value in the sequence number field 52a is placed into the sequence number field 54a of the input buffer 54 currently being filled by codec 40. The input sample that is input at the time the identified output sample is sent to speaker 41 is placed into the appropriate location in the input buffer 53 (in this example location 78). The location value for this input sample is placed in the sample index field 54b of the correlation tag 54 for the input buffer 54 currently being filled.

Figure 6:
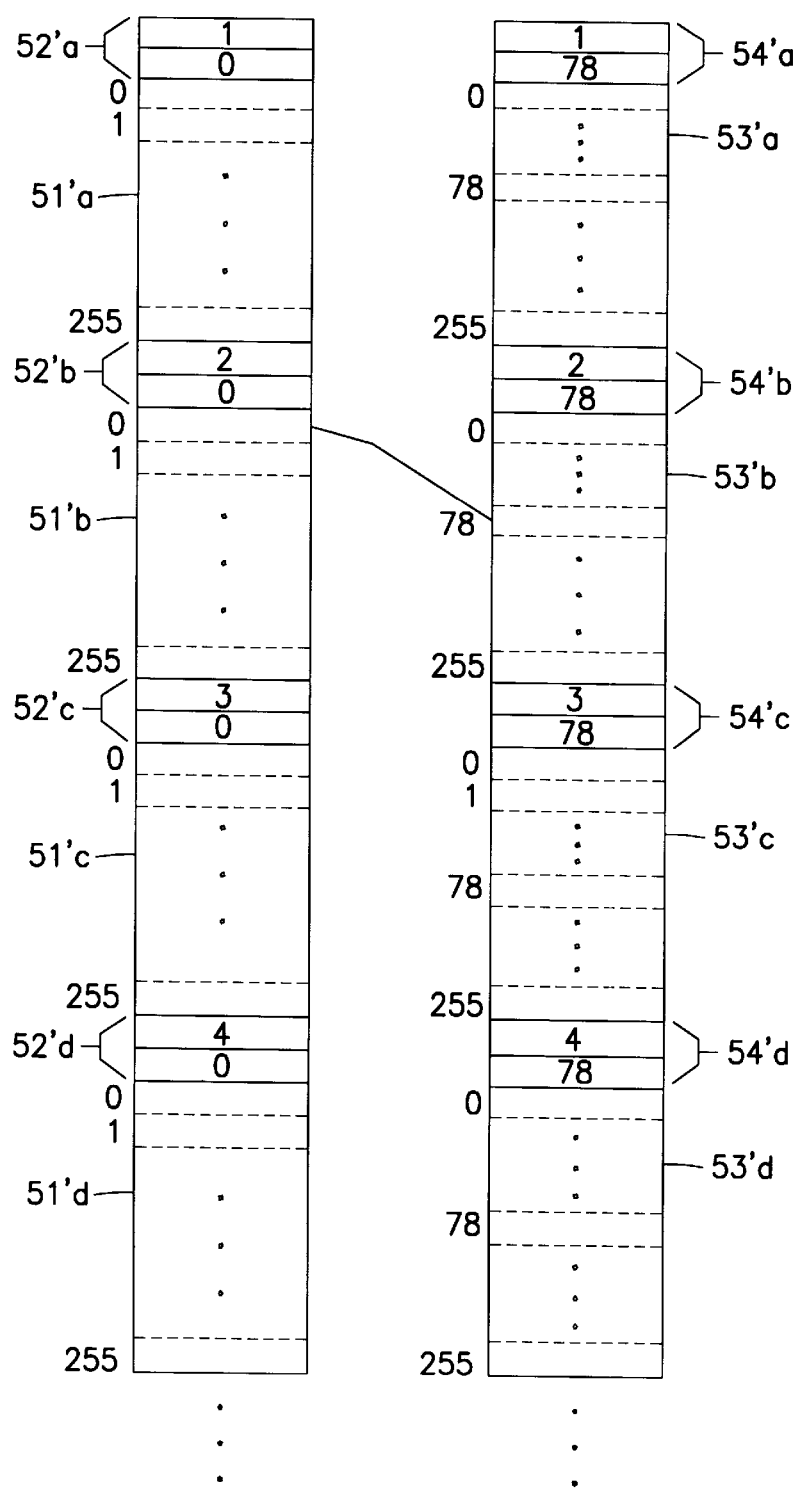
FIG. 6 shows an exemplary correlation of samples between output buffers and input buffers.

The input buffer 53 is eventually received at device driver 35 where it is stored either locally or in memory device 34 or the like. The device driver 35 acts upon the input buffers received from codec 40 (e.g., input buffer 53) and copies of the output buffers that were sent to codec 40 (e.g., output buffer 51). Referring to FIG. 6, a collection of output buffers 51'a–d with corresponding correlation tags 52'a–d and input buffers 53'a–d with corresponding correlation tags 54'a–d is shown. The device driver 35 looks at the sequence number field of each correlation tag 54'a–d for the input buffers 53'a–d. This indicates to device driver 35 that an input sample in a particular buffer will match up with an output sample in a buffer bearing the same sequence number field entry. The device driver 35 then looks to the sample index field for the particular input buffer and the corresponding output buffer to find the correlated input sample and output sample. In the example shown in FIG. 6, the sequence number field for correlation tag 54'b is the same as the value in the sequence number field for correlation tag 52'b. Accordingly, a correlated input/output sample pair exists in input buffer 53'b and output buffer 51'b. The location of the correlated input/output sample pair is indicated by the sample index fields in correlation tags 54'b and 52'b. In this example, the output sample in location 0 of output buffer 2 (51'b) is correlated with the input sample in location 78 of input buffer 2 (53'b).

Figure 1:
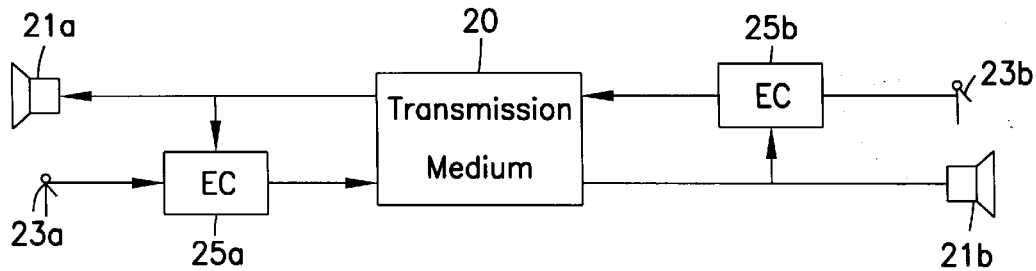
FIG. 1 is a generalized block diagram of a speaker phone system using echo cancellation.

Once a correlation has been made between the input and output samples, a correlated buffer is created for echo cancellation. Such a correlated buffer can be created locally in the device driver or in memory device 34. The appropriate manner for storing the correlated input and output samples is dictated by the operation of echo cancellation component 49 of device driver 35 (of FIG. 3) and component 12 of device driver 13 (of FIG. 1). An example for such storage would be that correlated input/output samples would be stored in an input buffer of 256 samples taken at time $t_1$ ($IB_1$) adjacent to a correlated output buffer of 256 samples output at time $t_1$ ($OB_1$) in device driver 35. Referring to FIG. 7, an example is shown of how the correlated buffer is constructed. The sample data from buffer 53'b, sample 0 through sample 255 are simply copied into buffer $IB_1$. Using the correlation established earlier by the correlation tags, sample data from buffer 51'b is copied into buffer $OB_1$. Because sample 0 of buffer 51'b correlates with sample 78 of buffer 53'b, sample 0 of buffer 51'b is copied into location 78 of buffer $OB_1$. Each successive sample in buffer 51'b is copied into the next successive location in buffer $OB_1$, until location 255 has been filled. Because the input samples are taken in at the microphone 42 (FIG. 3) at the same rate as output samples are sent to speaker 41 (FIG. 3), sample data from the previous output buffer 51'a can be used to fill in buffer $OB_1$, not copied from buffer 51'b. In this example, locations 0 through 77 of buffer $OB_1$, are filled with data copied from samples 178 through 255 of buffer 51'a.

Once the input and output samples are stored in an appropriate adjacent fashion, the echo cancellation component 49 of device driver 35 acts upon the correlated input/output samples to negate the detrimental effects of output signals from speaker 41 being input at microphone 42. In this example, echo cancellation component 49 sends modified input samples to buffer SD at modem 38. After protocol information has been added, these modified input samples are sent over transmission medium 45 by transceiver 55 to User B where they are eventually output.

The method and apparatus of the present invention provides for a saving of the total input/output bandwidth of the communication between serial controller 36 and modem 38 over serial channel 37. In particular, a correlated input/output buffer need not be sent back from codec 40 in order to present correlated input/output samples to echo cancellation component 49 of the device driver. Instead, only a slight increase in the input bandwidth and output bandwidth is seen to compensate for the correlation tag prepended to the output and input buffers. The present system is also robust in that if any buffer is lost or damaged, the correlation is re-acquired with every good input buffer received from codec 40.

One skilled in the art will appreciate that numerous modifications within the scope of the present invention can be made to the apparatus and method of the present invention described above. For example, the present invention can be used to provide echo cancellation in a speaker phone application over a transmission medium such as a telephone system (e.g., POTS) or the Internet system. Also, the present invention can be used to provide echo cancellation in a video conferencing application.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A method of creating input/output sample correlation comprising:
   (a) preparing an output buffer including a plurality of output samples;
   (b) appending a first correlation tag to said output buffer identifying one of said output samples in said output buffer;
   (c) outputting said output samples from said output buffer;
   (d) preparing an input buffer including a plurality of input samples; and
   (e) appending a second correlation tag to said input buffer, where said second correlation tag identifies one of said input samples received when said output sample identified by said first correlation tag is output in step (c).

2. The method of claim 1 further comprising:
   (f) storing each input sample and a correlated one of said output samples in a memory device, where said output sample identified by said first correlation tag is correlated to said input sample identified by said second correlation tag.

3. The method of claim 2 further comprising:
   (g) performing echo cancellation on each input sample based on said input sample and said correlated output sample.

4. The method of claim 3 wherein said output samples are received over a transmission medium and modified input samples generated during step (g) are sent over said transmission medium.

5. The method of claim 1 wherein each of said correlation tags includes a sequence number field storing information identifying one of said input and output buffers and an index sample field storing information identifying one of said samples in said one of said input and output buffers.

6. The method of claim 3 wherein each of said correlation tags includes a sequence number field storing information identifying one of said input and output buffers and an index sample field storing information identifying one of said samples in said one of said input and output buffers.

7. The method of claim 4 wherein each of said correlation tags includes a sequence number field storing information identifying one of said input and output buffers and an index sample field storing information identifying one of said samples in said one of said input and output buffers.

8. The method of claim 1 wherein said output samples arc output to a speaker in step (c) and said input samples are received from a microphone in step (d).

9. The method of claim 7 wherein said output samples are output to a speaker in step (c) and said input samples are received from a microphone in step (d).

10. The method of claim 9 wherein said transmission medium is a telephone system.

11. An apparatus to create input/output sample correlation comprising:
    an audio input device adapted to receive an audio input signal;
    an audio output device adapted to generate an audio output signal;
    a coder/decoder coupled to said audio input device and said audio output device, said coder/decoder converting said audio input signal into a plurality of input samples and placing said input samples into an input buffer, said coder/decoder generating a second correlation tag identifying one of said input samples in said input buffer, said coder/decoder converting output samples into an output signal for said audio output device; and
    a device driver coupled to said coder/decoder, said device driver sending said output samples from an output buffer to said coder/decoder and a first correlation tag identifying a specific sample in said output buffer, such that said second correlation tag identifies one of said input samples that is input at said audio input device when one of said output samples identified by said first correlation tag is sent to said audio output device.

12. The apparatus of claim 11 further comprising:
    a memory device storing each input sample and a correlated one of said output samples, where said one of output samples identified by said first correlation tag is correlated to said input sample identified by said second correlation tag.

13. The apparatus of claim 12 wherein said device driver includes an echo cancellation component that performs echo cancellation on one of said input samples based on said one of said input samples and one of said output samples correlated to said one of said input samples.

14. The apparatus of claim 13 wherein said output samples are received over a transmission medium and said device driver sends input signals modified by said echo cancellation component over said transmission medium.

15. The apparatus of claim 11 wherein each of said correlation tags includes a sequence number field storing information identifying one of said input and output buffers and an index sample field storing information identifying one of said samples in said one of said input and output buffers.

16. The apparatus of claim 13 wherein each of said correlation tags includes a sequence number field storing information identifying one of said input and output buffers and an index sample field storing information identifying one of said samples in said one of said input and output buffers.

17. The apparatus of claim 14 wherein each of said correlation tags includes a sequence number field storing information identifying one of said input and output buffers and an index sample field storing information identifying one of said samples in said one of said input and output buffers.

18. The apparatus of claim 11 wherein said output device is a speaker and said input device is a microphone.

19. The apparatus of claim 17 wherein said output device is a speaker and said input device is a microphone.

20. The apparatus of claim 19 wherein said coder/decoder is part of a modulator/demodulator coupled to said device driver via a serial channel and a serial controller.

21. The apparatus of claim 20 wherein said transmission medium is a telephone system.

22. The apparatus of claim 20 wherein said transmission medium is the Internet system.

\* \* \* \* \*

UNITED STATES PATENT AND TRADEMARK OFFICE
CERTIFICATE OF CORRECTION

PATENT NO : 5,953,411

DATED : September 14, 1999

INVENTOR(S) : Robert L. Farrell

It is certified that error appears in the above-identified patent and that said Letters Patent is hereby corrected as shown below:

Title page, item [57], line 5
replace "one of tie output"
with --one of the output--.

Signed and Sealed this

Fifth Day of December, 2000

Attest:

Q. TODD DICKINSON

*Attesting Officer*    *Director of Patents and Trademarks*